April 16, 1935. H. B. ROGERS 1,998,387
WINDSHIELD WATER SUPPLY
Filed Nov. 18, 1933
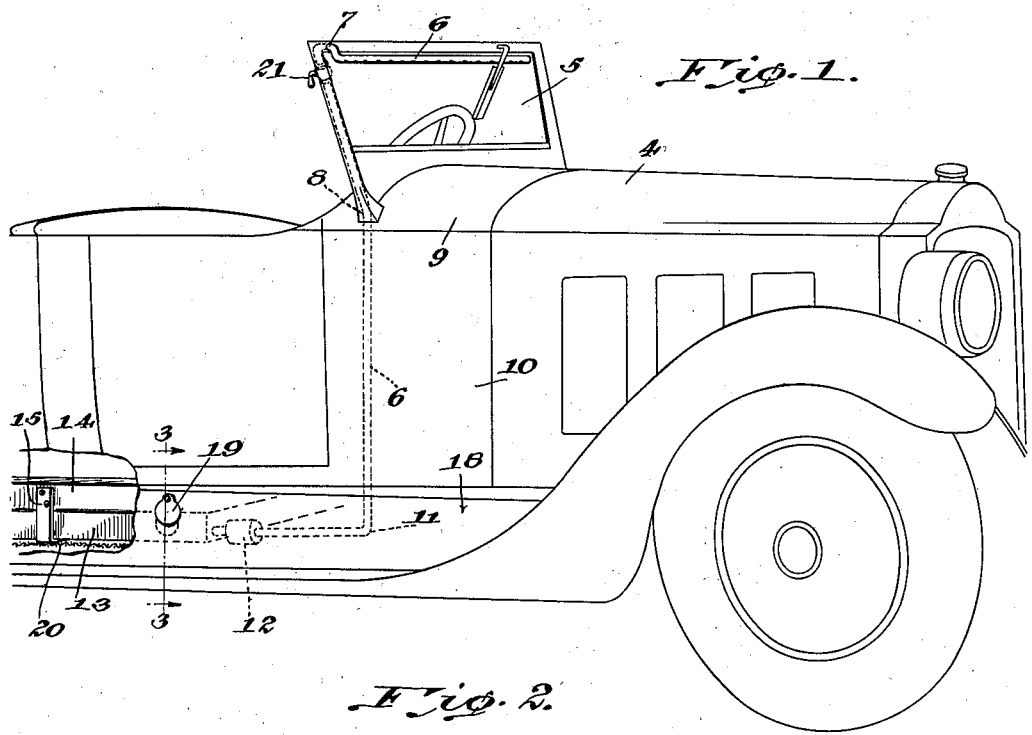
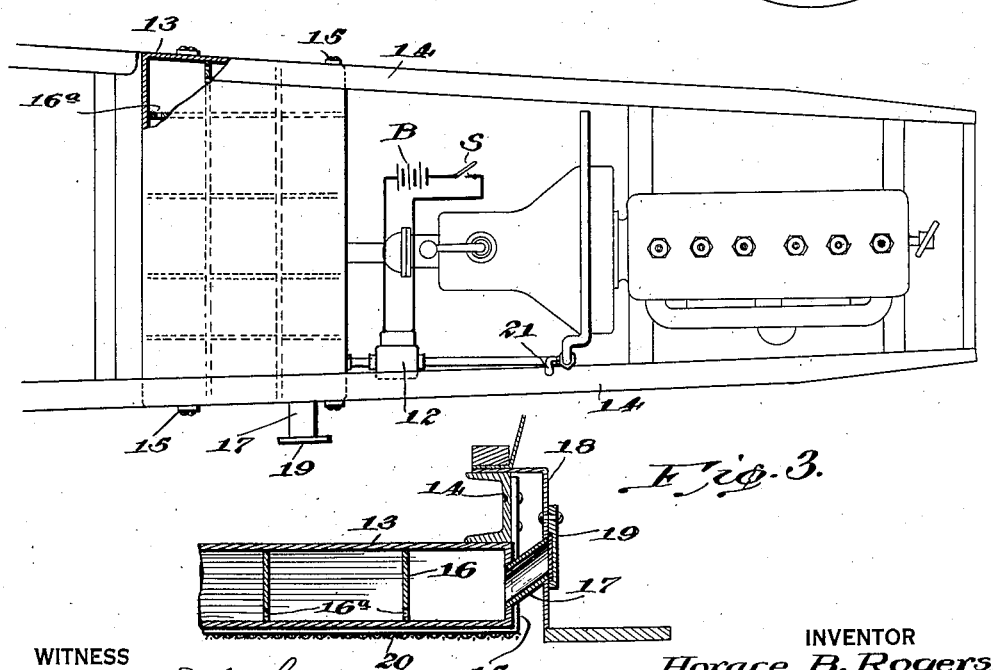
WITNESS
INVENTOR
Horace B. Rogers,
BY
ATTORNEY Patented Apr. 16, 1935

1,998,387

UNITED STATES PATENT OFFICE 1,998,387

WINDSHIELD WATER SUPPLY

Horace B. Rogers, Norfolk, Va.

Application November 18, 1933, Serial No. 698,719

2 Claims. (Cl. 20—40.5)

My invention relates to improvements in devices for supplying water to wind shields, and it consists in the combinations, constructions and arrangements herein described and claimed.

In a prior application, Serial Number 675,135, I disclosed a device by means of which the wind shield of an automobile could be supplied with water for the purpose of washing off insects, dirt, etc. while the car was in motion. This involved the use of a water tank in the top of the car, and therefore it was confined to cars having tops of the permanent type, such as sedans, coupes, coaches, etc.

An object of the present invention is to provide a water supply which may be used in connection with roadsters or touring cars having tops which may be let down or cars having no tops.

A further object is to provide a device of the type described which will insure a steady flow of water for washing wind shields, to keep them free from insects, dirt and the like, which is controllable at will by the driver or an occupant of the front seat.

Other objects and advantages will appear in the following specification and the novel features of the invention will be particularly pointed out in the appended claims.

My invention is illustrated in the accompanying drawing forming part of this application, in which:—

Figure 1 is a perspective view of an automobile equipped with the wind shield water supplying device.

Figure 2 is a horizontal view of the chassis showing the location of the supply tank and the pump, and, Figure 3 is an enlarged sectional view on the line 3—3 of Fig. 1.

In carrying out my invention I may make use of an automobile of any suitable type, such as a roadster, which is provided with the usual wind shield 5. A perforated pipe 6 extends across the top of the wind shield. This pipe has a bend, as shown at 7, and extends downwardly along the edge of the wind shield, being preferably covered by a casing 8 secured to the cowl 9. The pipe 6 passes on the inside of the body 10 and underneath the floor. It is bent at 11 and communicates with a pump 12. In the present instance I have shown this pump as being an electric pump, but it may be any suitable pump.

The water is stored in a tank 13 which extends from one side of the chassis frame 14 to the other. The tank is held in position by U-shaped straps 15, which are secured to the chassis frame 14, as shown in Fig. 3. The interior of this tank is provided with a series of partitions 16 for preventing undue movement of the water.

A filler pipe 17 leads into the tank and extends through the side 10 of the vertical side member 18, being normally covered by a pivoted closure 19. The tank is preferably made of metal, and in order to prevent the breaking thereof by stones or stumps, I make use of a wire netting 20 which extends underneath the tank, as shown in Fig. 3.

From the foregoing description of the various parts of the device, the operation thereof may be readily understood. The tank is filled with water through the pipe 17 and the closure 19 is brought over the end of the pipe. The water passes into the compartments in the tank and flows through the small openings 16a in the partition 16 until a level is reached. Now when it is desired to fold the wind shield to wash off dirt, dust or insects, the switch S is closed and the current from battery B or other suitable source drives the pump which forces the water up and out through the openings in the pipe 6. At 21 I have shown a valve for regulating the flow, this valve being within easy reach of the driver of the vehicle or the other occupant of the front seat, so that the flow may be controlled. The perforations in the pipe 6 are such as to afford a complete washing of the wind shield, that is to say, the entire surface of the windshield is reached by the spray from the pipe. This spray is of sufficient force to carry away anything on the windshield, but the spray may be so regulated as to reduce the force of the spray to a minimum.

I claim:

1. The combination with the wind-shield of an automobile, of a perforated pipe disposed along the upper portion of the wind shield, said pipe having an extension along the edge of the wind shield and down underneath the floor of the automobile, a water tank carried by the chassis and having a filling tube extending to the side of the body, a guard member for protecting the bottom of the water tank disposed underneath the tank, a pump for pumping water from the tank into the pipe, means for actuating the pump at will, and a valve disposed in the pipe within the reach of occupants of the front seat for controlling the flow of the water delivered by the pipe to the wind shield.

2. The combination with the wind-shield of an automobile, of a perforated pipe disposed along the upper portion of the wind shield, said pipe having an extension along the edge of the windshield and down underneath the floor of the automobile, a water tank carried by the chassis and having a filling tube extending to the outer side of the body, a guard member disposed underneath the tank for protecting the bottom of the tank, a pump for pumping water from the tank into the pipe, an electric motor, a source of current, and a switch for actuating the motor at will.

HORACE B. ROGERS.